United States Patent Office 3,626,581
Patented Dec. 14, 1971

3,626,581
WIRE WOUND CONICAL LINER FOR SHAPED CHARGE WARHEAD
Clarence E. Weinland, Vista, Calif., assignor to the United States of America as represented by the Secretary of the Navy
No Drawing. Filed June 5, 1970, Ser. No. 59,793
Int. Cl. B23p 17/00
U.S. Cl. 29—424                                                           4 Claims

ABSTRACT OF THE DISCLOSURE

Conical metallic liners for shaped charges which comprises providing a suitably formed mandrel precoated with a release agent, winding wire of uniform diameter on said mandrel and bonding each turn in place.

GOVERNMENT INTEREST

The invention described herein may be manufactured and used by or for the Government of the United States of America for governmental purposes without the payment of any royalties thereon or therefor.

BACKGROUND OF THE INVENTION

The present invention relates to conical metal liners for shaped charges.

Liners for the cavities of shaped charge explosives are well known in the explosive field. They are generally fabricated from copper, bronze or other solid metal or alloy and may be coated with a thin film of metal or alloy. Industrial applications include lathe machining from solid stock, deep drawing from sheet stock, powder metallurgy and sintering, spinning with, or without, a roller tool and electroforming. All these methods are difficult and time consuming. The equipment is expensive and production is slow. The present method not only requires inexpensive tooling, but can be adapted to mass production or automation. The method also readily meets the basic requirements for high quality conical liners which must be extremely uniform in wall thickness when measured in any plane transverse to the cone axis.

BRIEF DESCRIPTION OF THE INVENTION

In accordance with the present invention a liner for a shaped charge is formed which comprises helically winding wire of uniform diameter onto a preformed cone-shaped mandrel until a cone is formed and then bonding each turn of wire to the other by a suitable bonding agent. The turns are made on the mandrel so as to lie in contact with the previous turn whereby voids are eliminated. The turns must be uniformly tight on the mandrel which is usually precoated with a mold-release agent so that the cone can be easily removed from the mandrel when the bonding step is completed.

The following examples are given which illustrate the invention in greater detail.

Example I

Preformed stainless steel mandrels (42° included angle) were first dipped in a mold-release agent comprising an ocher-tragacanth water slurry and dried. Copper wire, round in cross-section and of uniform diameter throughout its length, was secured to the tip of the mandrel (as by tying the end of the wire to a perforation provided at the tip of the mandrel). The mandrel was mounted so that a wire winding apparatus proceeded to helically wind the wire uniformly tight around the mandrel forming a cone. The turns of wire were positioned so that each turn was in contact with the previous turn thereby eliminating voids. When winding was completed, the wire was secured in a suitable manner to the base of the cone. In this instance a machine screw was provided to which the wire was secured and snipped. The unit comprising the mandrel and cone was removed from the winding apparatus and the cone was painted with a bonding agent consisting of methyl-2-cyanoacrylate. Other suitable bonding adhesive materials, plastics, or solder may be used to bond the turns of wire to each other. The wire ends at tip and base were then cut and the cone removed from the mandrel. The ocher-tragacanth slurry applied to the mandrel prior to winding the wire to form the cone acts as a release agent. The mandrel must be covered with a release agent or anti-flux unless the bonding agent is of a material which will not adhere to the mandrel. Several cones fabricated as described herein of round copper wire bonded with methyl-2-cyanoacrylate were tested in shaped charges loaded with the standard composition B explosive and found successful. At zero standoff one such charge penetrated about one-inch into steel armor plate.

Example II

Another series of preformed stainless steel mandrels were dipped in ocher-tragacanth water slurry and dried. Square copper wire 0.045" x 0.045" with 0.012" corner radius was wrapped around each mandrel. As described in Example I herein, it is necessary that the wire be secured to the tip of the mandrel before winding, and after winding the wire again must be secured to the base of the mandrel by holding it under a machine screw or other suitable means, after which the wire can be cut and the mandrel and winding or cone can be removed from the winding device and handled as a unit through the final step of the process by which the turns are bonded to each other. Machining the base and tip of each cone was accomplished on conical mandrels which were made in the same lathe as the winding mandrel with the cone angle carefully matched and the machining mandrel held in a collet with a mark on the mandrel returned to the same rotational position as when the mandrel was made.

The cones were tested. Each cone with copper base-ring and solid copper tip soft-soldered in place, were cemented into 10-inch long pieces of 2-inch extra heavy steel pipe using methyl-2-cyanoacrylate adhesive, each cone being also externally coated with this same adhesive, and these assemblies were then loaded with Composition B, a standard high explosive. When fired against 4 x 4 x 12-inch blocks of armor steel the penetrations were 4.92, 4.30, 3.54, and 2.76 inches, respectively.

Square wire naturally bends more easily corner wise than flat wire due to the greater moment of inertia of a square about an axis perpendicular to opposite faces than about a diagonal axis. The square wire used herein, as received, was oily and probably contained a sulfonated drawing compound which was found to interfere with brazing and had to be removed. Undiluted strong household ammonia was found to be effective in removing both oil and most of the surface oxide from the copper. However, if not used within 48 hours, oxide reformed on the wire which interferes appreciably with brazing.

The ocher-tragacanth slurry provides a slightly yielding surface on the mandrel which allows the wire to adjust and lie nearly flat, otherwise the wire will persist in twisting and resting on the mandrel cornerwise. Other mold-release agents may be used.

Cones can be made in two or more layers of different materials. High quality cones are made by this process which are of uniform thickness when measured in any plane transverse to the cone axis. In the present invention uniformity is achieved by using wire of uniform cross-section throughout its length and winding uniformly tight onto the mandrel.

The turns may be bonded by other adhesives or plastic, or by solder (metal melting below 800° F.), by brazing with meal melting above 800° F. or by welding. Whatever bonding agent is used, it must be uniformly distributed over the conical winding.

The cones formed herein may be used as preforms or blanks to be subsequently die-formed in heavy presses, to smooth their surfaces, refine dimensions, or to change their basic shapes from conical to trumpet, bell, or other forms.

What is claimed is:

1. A method for fabricating a conical liner for a shaped charge warhead which comprises
    (a) providing a cone-shaped mandrel precoated with a mold-release agent;
    (b) anchoring wire of uniform diameter to the apex of said mandrel;
    (c) helically winding said wire in turns of uniform tightness onto said mandrel until a cone is formed; each of said turns being in contact with the previous turn thereby eliminating voids;
    (d) securing the end of said wire to the base of said mandrel;
    (e) bonding said wire turns to each other; and
    (f) removing said cone from said mandrel by cutting the wire at the apex and base of said mandrel.

2. The method in accordance with claim 1 wherein the wire is copper.

3. The method in accordance with claim 2 wherein bonding of said wire turns comprises applying methyl-2-cyanoacrylate to the outside of said cone.

4. The method in accordance with claim 3 wherein the mold-release agent is an ocher-tragacanth slurry.

References Cited

UNITED STATES PATENTS

| | | | |
|---|---|---|---|
| 2,749,607 | 6/1956 | McIlvane | 29—480 X |
| 3,149,598 | 9/1964 | Rees et al. | 29—480 X |
| 3,218,975 | 11/1965 | Massey | 102—56 |
| 3,273,226 | 9/1966 | Brous et al. | 29—423 X |

JOHN F. CAMPBELL, Primary Examiner

V. A. DI PALMA, Assistant Examiner

U.S. Cl. X.R.

29—423, 477.3, 475